(12) United States Patent
Jiang et al.

(10) Patent No.: US 11,295,110 B2
(45) Date of Patent: Apr. 5, 2022

(54) UNDER-SCREEN BIOMETRIC IDENTIFICATION APPARATUS AND ELECTRONIC DEVICE

(71) Applicant: SHENZHEN GOODIX TECHNOLOGY CO., LTD., Shenzhen (CN)

(72) Inventors: Peng Jiang, Shenzhen (CN); Jianyang Zhang, Shenzhen (CN); Wei Ling, Shenzhen (CN)

(73) Assignee: SHENZHEN GOODIX TECHNOLOGY CO., LTD., Shenzhen (CN)

( * ) Notice: Subject to any disclaimer, the term of this patent is extended or adjusted under 35 U.S.C. 154(b) by 201 days.

(21) Appl. No.: 16/658,057

(22) Filed: Oct. 19, 2019

(65) Prior Publication Data
US 2020/0050823 A1 Feb. 13, 2020

Related U.S. Application Data

(63) Continuation of application No. PCT/CN2018/091641, filed on Jun. 15, 2018.

(51) Int. Cl.
G06K 9/00 (2006.01)
H01L 27/32 (2006.01)
G02B 5/30 (2006.01)
H01L 27/146 (2006.01)

(52) U.S. Cl.
CPC ....... *G06K 9/00046* (2013.01); *G02B 5/3083* (2013.01); *G06K 9/00013* (2013.01); *H01L 27/3234* (2013.01); *H01L 27/14678* (2013.01)

(58) Field of Classification Search
CPC .. G02B 5/3083; G06F 21/32; G06K 9/00013; G06K 9/0004; G06K 9/00046; H01L 27/14678; H01L 27/3234
See application file for complete search history.

(56) References Cited

U.S. PATENT DOCUMENTS

| 6,147,738 | A | 11/2000 | Okamoto |
| 2009/0021487 | A1 | 1/2009 | Tien |
| 2015/0177884 | A1 | 6/2015 | Han |
| 2016/0283773 | A1 | 9/2016 | Popovich et al. |
| 2017/0357841 | A1 | 12/2017 | Popovich et al. |
| 2017/0372113 | A1* | 12/2017 | Zhang .................. G06K 9/2036 |
| 2018/0005007 | A1 | 1/2018 | Du et al. |

(Continued)

FOREIGN PATENT DOCUMENTS

| CN | 105184282 A | 12/2015 |
| CN | 105808006 A | 7/2016 |

(Continued)

*Primary Examiner* — Michael J Vanchy, Jr.

(57) ABSTRACT

An under-screen biometric identification apparatus and electronic device. The under-screen biometric identification apparatus includes an optical function layer, including a first linear polarizer and a first quarter-wave plate, wherein the first linear polarizer and the first quarter-wave plate are configured to be stacked; a biometric identification module, configured to perform biometric identification based on light transmitted to the biometric identification module via the optical function layer. The under-screen biometric identification apparatus could improve the performance of the under-screen biometric identification.

12 Claims, 6 Drawing Sheets

(56) References Cited

U.S. PATENT DOCUMENTS

| | | | |
|---|---|---|---|
| 2018/0031835 A1 | 2/2018 | Hoppe | |
| 2018/0033835 A1 | 2/2018 | Zeng et al. | |
| 2018/0247143 A1 | 8/2018 | Cho et al. | |
| 2018/0314873 A1 | 11/2018 | Yang et al. | |
| 2018/0315803 A1 | 11/2018 | Jin | |
| 2018/0357462 A1* | 12/2018 | Mackey | G06K 9/00026 |
| 2019/0042827 A1 | 2/2019 | Popovich et al. | |
| 2019/0079236 A1 | 3/2019 | Hung | |
| 2019/0114457 A1 | 4/2019 | Li et al. | |
| 2019/0171050 A1* | 6/2019 | Chen | G02B 6/0076 |
| 2020/0012839 A1 | 1/2020 | Popovich et al. | |
| 2020/0117878 A1* | 4/2020 | Li | H01L 27/3234 |

FOREIGN PATENT DOCUMENTS

| | | | |
|---|---|---|---|
| CN | 106067018 A | 11/2016 | |
| CN | 106845451 A | 6/2017 | |
| CN | 107004130 A | 8/2017 | |
| CN | 107025451 A | 8/2017 | |
| CN | 107102693 A | 8/2017 | |
| CN | 107170360 A | 9/2017 | |
| CN | 107193412 A | 9/2017 | |
| EP | 0935157 A2 | 8/1999 | |
| WO | 2015099410 A1 | 7/2015 | |
| WO | 2017129126 A1 | 8/2017 | |
| WO | 2018049944 A1 | 3/2018 | |

* cited by examiner

UNDER-SCREEN BIOMETRIC IDENTIFICATION APPARATUS AND ELECTRONIC DEVICE

CROSS-REFERENCE TO RELATED APPLICATIONS

The present application is a continuation of international application No. PCT/CN2018/091641, filed on Jun. 15, 2018, the disclosure of which is incorporated herein by reference in its entirety.

TECHNICAL FIELD

Embodiments of the present application relate to the field of biometric identification technologies, and in particular, to an under-screen biometric identification apparatus and an electronic device.

BACKGROUND

With rapid development of mobile phone industry, a biometric identification technology has received more and more attention, practical use of a more convenient under-screen biometric identification technology, such as an under-screen fingerprint identification technology, has become a popular requirement.

In the under-screen biometric identification technology, an under-screen biometric identification module is disposed under a screen, and a light leakage area is set under the screen. By detecting light carrying information of an object (such as a finger) transmitted through the light leakage area, the under-screen biometric identification module implements under-screen biometric identification. However, the module under the light leakage area under the screen may reflect light to the above of the screen which may cause an appearance problem; on the other hand, light which is irrelative to the biometric identification leaking through the light leakage area may also affect efficiency of the biometric identification. Due to the foregoing problems, performance of the under-screen biometric identification is affected.

Therefore, how to improve the performance of the under-screen biometric identification has become a technical problem to be solved.

SUMMARY

Embodiments of the present application provides an under-screen biometric identification apparatus and an electronic device, which could improve performance of under-screen biometric identification.

In a first aspect, provided is an under-screen biometric identification apparatus, including:

an optical function layer, including a first linear polarizer and a first quarter-wave plate, wherein the first linear polarizer and the first quarter-wave plate are configured to be stacked;

a biometric identification module, configured to perform biometric identification based on light transmitted to the biometric identification module via the optical function layer.

The technical solution of the embodiment of the present application adopts an optical function layer including a linear polarizer and a quarter-wave plate, which could improve the performance of the under-screen biometric identification.

In some possible implementations, the first quarter-wave plate is disposed at a side of the optical function layer adjacent to the biometric identification module.

The technical solution of the embodiment of the present application could greatly weaken a reflected light of the biometric identification module, thereby improving the appearance problem.

In some possible implementations, the first linear polarizer is disposed at a side of the optical function layer adjacent to the biometric identification module.

The technical solution of the embodiment of the present application could reduce an image noise and improve the efficiency of biometric identification.

In some possible implementations, an optical axis of the first quarter-wave plate is at an angle of 45° to a polarization direction of the first linear polarizer.

In some possible implementations, the optical function layer further includes a second quarter-wave plate, wherein the second quarter-wave plate, the first linear polarizer, and the first quarter-wave plates are configured to be stacked, the first linear polarizer is disposed between the second quarter-wave plate and the first quarter-wave plate, the first quarter-wave is disposed at a side of the optical function layer adjacent to the biometric module.

The technical solution of the embodiment of the present application could not only greatly weaken the reflected light of the biometric identification module to improve the appearance problem, but also reduce the image noise to improve the efficiency of biometric identification.

In some possible implementations, an optical axis of the first quarter-wave plate is at an angle of 45° to a polarization direction of the first linear polarizer; an optical axis of the second quarter-wave plate is at an angle of 45° to the polarization direction of the first linear polarizer.

In some possible implementations, the optical function layer is disposed under a display screen, and the biometric identification module is disposed under the optical function layer.

In some possible implementations, the display screen includes a light emitting layer, a third quarter-wave plate, and a second linear polarizer, wherein the third quarter-wave plate is disposed above the light emitting layer, the second linear polarizer is disposed above the third quarter-wave plate.

In some possible implementations, an optical axis of the third quarter-wave plate is at an angle of 45° to a polarization direction of the second linear polarizer.

In some possible implementations, the optical function layer is disposed under the display screen in a direction in which an emergent light intensity is the largest.

In some possible implementations, the biometric identification module includes a pinhole array and a photoelectric sensor array, wherein the light is transmitted to the photoelectric sensor array through the pinhole array.

In some possible implementations, sidewalls of the pinhole array are black.

In the technical solution of the embodiment of the present application, a color of the pinhole array can be consistent with other areas outside the light leakage area of the display screen, that is, black, so that the appearance problem may be further improved.

In some possible implementations, the biometric identification module further includes a filter, wherein the filter is disposed between the pinhole array and the photoelectric sensor array for filtering the light.

In a second aspect, provided is an electronic device, including:

a display screen and the under-screen biometric identification apparatus of the first aspect or any possible implementation of the first aspect.

In some possible implementations, the display screen is an organic light-emitting diode display screen, and a light-emitting layer of the display screen includes multiple organic light emitting diode light sources, wherein the under-screen biometric identification apparatus adopts at least some of the organic light emitting diode light source as an excitation light source for biometric identification.

DESCRIPTION OF EMBODIMENTS

Technical solutions in embodiments of the present application will be described hereinafter in combination with the attached drawings.

As electronic device enters the era of full screen, a biometric collection area on the front of the electronic device is squeezed by a full screen, so an under-screen (Under-display or Under-screen) biometric identification technology is receiving more and more attention. The under-screen biometric identification technology refers to mounting a biometric identification module (such as a fingerprint identification module) under a display screen, thereby realizing biometric identification operation in a display area of the display screen, without setting a biometric collection area outside the display area on the front of the electronic device.

The under-screen biometric identification technology uses light returned from a top surface of a device display assembly for fingerprint sensing and other sensing operations. The returned light carries information of an object (such as a finger) in touch with the top surface, and a particular optical sensor module located under the display screen is implemented by collecting and detecting the returned light. By properly configuring optical elements collecting and detecting the returned light, a design of the optical sensor module can achieve desired optical imaging.

It should be understood that the technical solutions of the embodiments of the present application may be applied to various electronic devices, such as portable or mobile computing devices like smart phones, notebook computers, tablet computers, game devices, and other electronic devices like electronic databases, automobiles, and bank ATMs (Automated Teller Machine, ATM), but the embodiments of the present application are not limited thereto.

It should also be understood that the technical solutions of the embodiments of the present application may perform other biometric identification in addition to fingerprint identification, for example, living identification, etc. But the embodiments of the present application are not limited thereto, either.

Figure 1:
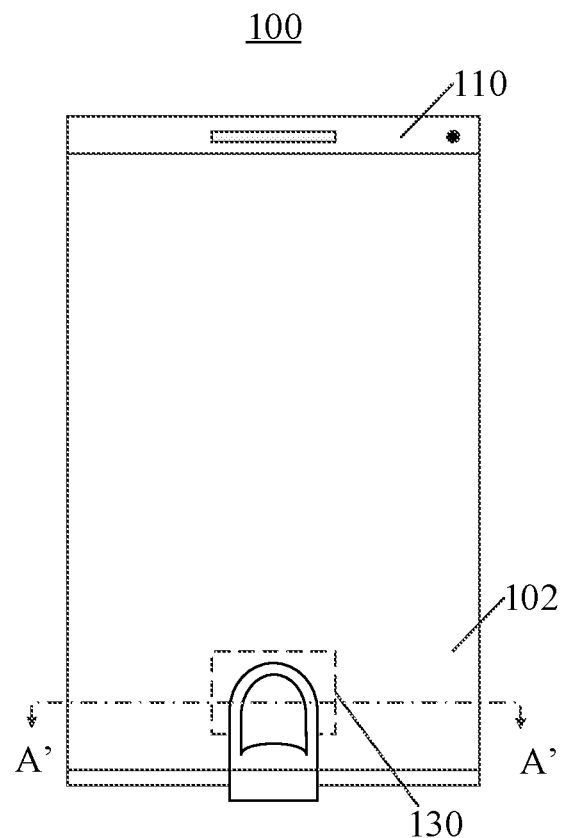
FIG. 1 is a schematic plan view of an electronic device to which the present application is applicable.
Figure 2:
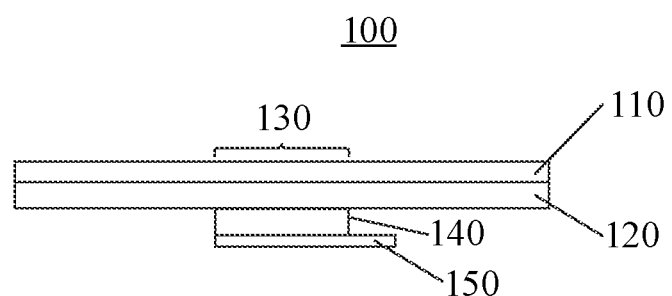
FIG. 2 is a partial schematic cross-sectional view of the electronic device shown in FIG. 1 taken along A'-A'.

FIG. 1 and FIG. 2 illustrate schematic plan views of an electronic device 100 to which an under-screen biometric identification apparatus is applicable, where FIG. 1 is a schematic front view of the electronic device 100, and FIG. 2 is a partial schematic cross-sectional view of the electronic device shown in FIG. 1 taken along A'-A'.

As shown in FIG. 1 and FIG. 2, the electronic device 100 may include a display screen 120 and a biometric identification module 140; and the display screen 120 has a display area 102, and the biometric identification module 140 is disposed under the display screen 120.

The display screen 120 may be a self-emitting display screen, which adopts a self-emitting display unit as a display pixel. For example, the display screen 120 may be an organic light-emitting diode (OLED) display screen or a micro light-emitting diode (micro-LED) display screen. In other alternative embodiments, the display screen 120 may also be a liquid crystal display (LCD) or other passive light-emitting display screens, which is not limited in the embodiments of the present application.

On the other hand, the display screen 120 is specifically a touch display screen, which can not only display a screen, but also detect a touching or pressing operation of a user, thereby providing the user with a human-machine interaction interface. For example, in an embodiment, the electronic device 100 may include a touch sensor, and the touch sensor may be specifically a touch panel (TP) that may be disposed on a surface of the display screen 120 or may be partially integrated or entirely integrated into an interior of the display screen 120 to form the touch display screen.

The biometric identification module 140 may specifically be an optical biometric identification module, such as an optical fingerprint module, which is mainly used for collecting biometric information (such as fingerprint image information) of the user. In the embodiment of the present application, the biometric identification module 140 may be at least disposed in a partial area under the display screen 120, such that a biometric collecting area (or a sensing area) 130 of the biometric identification module 140 is at least partially located in a display area 102 of the display screen 120.

As an embodiment, the biometric identification module 140 may specifically include an optical biometric sensor with an optical sensing array, such as an optical fingerprint sensor; and the optical sensing array includes multiple optical sensing units, and the area where the optical sensing array locates corresponds to the biometric collection area 130 of the biometric identification module 140. As shown in FIG. 1, the biometric collection area 130 is located in the display area 102 of the display screen 120, and therefore, when the user needs to unlock the electronic device 100 or perform other biometric verification, a biometric input operation may be implemented merely by pressing a finger on the biometric collection area 130 located in the display screen 120. Since biometric collection and detection may be implemented inside the display area 102 of the display screen 120, there is no need to reserve space on the front side of the electronic device adopting the foregoing structure to set a fingerprint button (such as a Home button), so that a full screen solution can be adopted. Therefore, the display area 102 of the display screen 120 can be substantially extended to the entire front surface of the electronic device 100.

In the embodiment of the present application, the display screen 120 adopting an OLED display screen is taken as an example, a light emitting layer of the display screen 120 has an OLED display unit array arranged in an array, and the biometric identification module 140 can utilize an OLED display unit (that is, an OLED light source) located in the biometric collection area 130 of the OLED display screen 120 as an excitation light source for biometric detection and identification. Certainly, it should be understood that in other alternative implementations, the biometric identification module 140 may also provide an optical signal for biometric detection and identification by adopting an internal light source or an external light source. In this case, the under-screen biometric identification apparatus can be applied not only to a self-emitting display screen such as an OLED display screen, but also to a non-self-emitting display screen such as a liquid crystal display screen or other passive light-emitting display screens. Moreover, the optical sensing array of the biometric identification module 140 is specifically a photo detector array (or photo-detector array) including multiple photo detectors arranged in an array, and the photo detectors may be used as the foregoing optical sensing unit.

When a finger touches, presses, or approaches (collectively referred to as pressing in this application, for convenience of description) the biometric collection area 130, light emitted by a display unit of the biometric collection area 130 is reflected by the finger to form reflected light, and the reflected light may carry biometric information of the user's finger. For example, after the light is reflected by a fingerprint of the user's finger, since the reflected light of a ridge of the fingerprint is different from that of a valley, the reflected light carries the fingerprint information of the user. The reflected light returns to the display screen 120 and is received by a photo detector array of the biometric identification module 140 under the display screen, and is converted into a corresponding electrical signal, that is, a biometric detection signal. The electronic device 100 may acquire the biometric information of the user based on the biometric detection signal, and may further perform biometric matching verification, thereby completing identity verification of a current user in order to confirm whether the current user has the authority to perform a corresponding operation on the electronic device 100.

In other alternative embodiments, the biometric identification module 140 may also be disposed in an entire area under the display screen 120, so as to extend the biometric collection area 130 to the entire display area 102 of the display screen 120, thereby realizing full screen biometric identification.

It should be understood that, in a specific implementation, the electronic device 100 further includes a protective cover 110; the protective cover 110 may specifically be a transparent cover, such as a glass cover or a sapphire cover, which is located on the display screen 120 and covers the front surface of the electronic device 100; and a surface of the protective cover 110 may also be provided with a protective layer. Therefore, in an embodiment of the present application, the so-called pressing the display screen 120 by a finger may actually refer to pressing the cover 110 on the display screen 120 or covering a surface of the protective layer of the cover 110.

On the other hand, a circuit board 150, such as a flexible printed circuit (FPC), may be disposed under the biometric identification module 140; the biometric identification module 140 may be soldered to the circuit board 150 through a soldering pad, and electrical interconnection and signal transmission with other peripheral circuits or other elements of the electronic device 100 are implemented by the circuit board 150. For example, the biometric identification module 140 may receive a control signal of a processing unit of the electronic device 100 through the circuit board 150, and may also output the biometric detection signal to the processing unit, control unit or the like of the electronic device 100 through the circuit board 150.

In some implementations, the biometric module 140 can transmit light to the sensing array by adopting a light transmission structure (or light directing structure), such as a periodic pinhole array, a collimator array, or a lens array.

However, the biometric module 140 may reflect light to the above of the electronic device 100 which causes an appearance problem. For example, an installation area of the biometric module 140 may be visible under strong light; on the other hand, light transmitted to the biometric module 140 without carrying the information of the object also affects the efficiency of the biometric identification. The foregoing problems may affect the performance of the under-screen biometric identification.

Therefore, the embodiment of the present application provides an improved technical solution for under-screen biometric identification to improve the performance of under-screen biometric identification.

Figure 3:
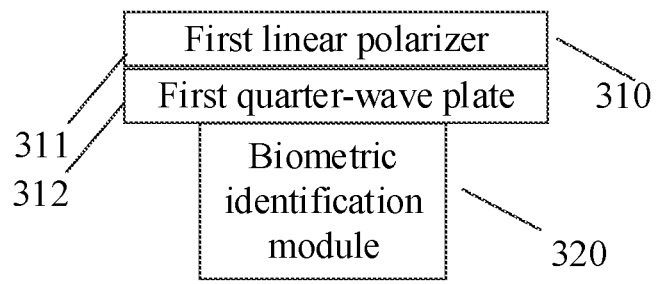
FIG. 3 is a schematic view of an under-screen biometric identification apparatus provided in an embodiment of the present application.

FIG. 3 is a schematic view of an under-screen biometric identification apparatus 300 provided in an embodiment of the present application.

As shown in FIG. 3, the under-screen biometric apparatus 300 may include: an optical function layer 310 and a biometric identification module 320.

The optical function layer 310 may include a first linear polarizer 311 and a first quarter-wave plate 312, wherein the first linear polarizer and the first quarter-wave-plate are configured to be stacked.

The biometric identification module 320 is configured to perform biometric identification based on light transmitted to the biometric identification module 320 via the optical function layer 310.

In the embodiment of the present application, light transmitted to the biometric identification module 320 and light reflected from the biometric identification module 320 are processed by the optical function layer 310. A design of the optical function layer 310 takes into account a polarization state of the light, stack of the linear polarizer and the quarter-wave plate may let useful light pass through while filter useless light, and weaken reflected light, thereby improving the performance of the under-screen biometric identification.

Optionally, in the embodiment of the present application, an optical axis of the first quarter-wave plate 312 is at an angle of 45° to a polarization direction of the first linear polarizer 311. The optical axis of the quarter-wave plate is at an angle of 45° to the polarization direction of the linear polarizer, which could reduce loss of light.

Optionally, in an embodiment of the present application, as shown in FIG. 3, the first quarter-wave plate 312 is disposed at a side of the optical function layer 310 adjacent to the biometric identification module 320.

That is, the first linear polarizer 311 and the first quarter-wave plate 312 may adopt a positional relationship as shown in FIG. 3, that is, the first linear polarizer 311 is above the first quarter-wave plate 312, the first quarter-wave plate 312 is adjacent to the biometric identification module 320.

Figure 4:
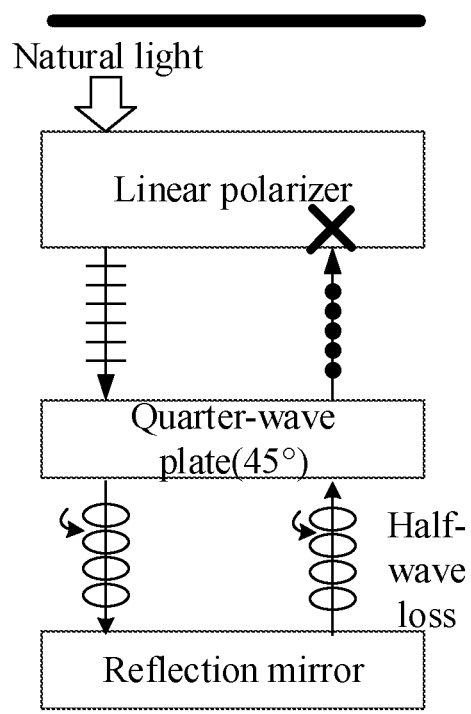
FIG. 4 is a schematic view of the principle of anti-reflection light.

Combination of a linear polarizer and a quarter-wave plate prevents an object under the quarter-wave plate from reflecting light to the above of the linear polarizer. As shown in FIG. 4, natural light passes through the linear polarizer to form linearly polarized light, and then it passes through the quarter-wave plate to form circularly polarized light, and an object under the quarter-wave plate reflects the circularly polarized light in a vertical direction and adds a phase change of 180°, that is, π change. The reflected circularly polarized light after π changing may become a linearly polarized light after passing through the quarter-wave plate again, and an angle between the polarization directions of the linearly polarized light and the linear polarizer is 90°, which forms an extinction condition. Thus, most of the reflected light may not reach above the linear polarizer.

Therefore, with the scheme shown in FIG. 3, the reflected light of the biometric identification module 320 can be greatly weakened. When the under-screen biometric apparatus 300 is disposed under the display screen, substantially no reflected light reaches above the display screen, so the biometric identification module 320 is invisible to the user, thereby improving the appearance problem.

Figure 5:
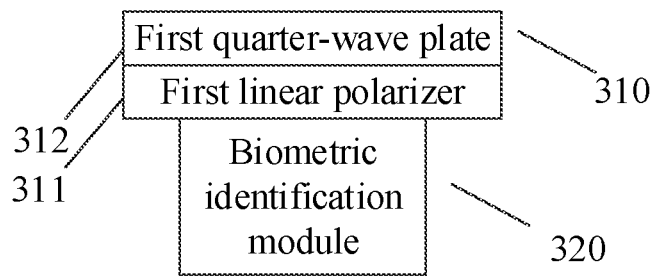
FIG. 5 is a schematic view of an under-screen biometric identification apparatus provided in another embodiment of the present application.

Optionally, in an embodiment of the present application, as shown in FIG. 5, the first linear polarizer 311 is disposed at a side of the optical function layer 310 adjacent to the biometric identification module 320.

That is, the first linear polarizer 311 and the first quarter-wave plate 312 may also adopt a positional relationship as shown in FIG. 5, that is, the first linear polarizer 311 is under the first quarter-wave plate 312, the first linear polarizer 311 is adjacent to the biometric identification module 320.

Figure 6:
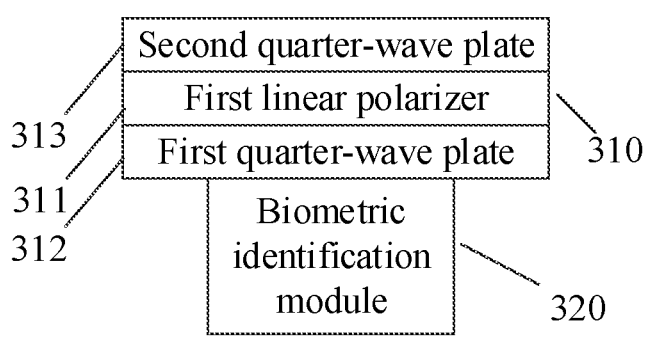
FIG. 6 is a schematic view of an under-screen biometric identification apparatus provided in another embodiment of the present application.

Optionally, in an implementation of the present application, as shown in FIG. 6, the optical function layer 310 further includes a second quarter-wave plate 313, wherein the second quarter-wave plate 313, the first linear polarizer 311, and the first quarter-wave plate 312 are stacked, the first linear polarizer 311 is disposed between the second quarter-wave 313 plate and the first quarter-wave plate 312, the first quarter-wave 312 is disposed at a side of the optical function layer 310 adjacent to the biometric module 320.

Optionally, an optical axis of the first quarter-wave plate 312 is at an angle of 45° to a polarization direction of the first linear polarizer 311; an optical axis of the second quarter-wave plate 313 is at an angle of 45° to the polarization direction of the first linear polarizer 311.

In this embodiment, the optical function layer 310 adopts two quarter-wave plates and one linear polarizer. With such a design, in addition to improving the appearance problem, a polarization state of useful light related to the biometrics may be detected, thereby enhancing a biometric signal and weakening stray light, such that the efficiency of the biometric identification may be improved.

Figure 7:
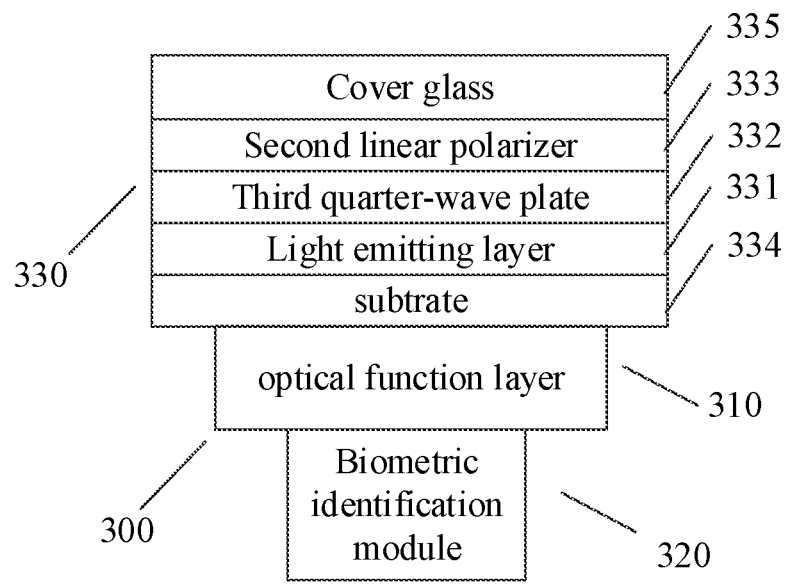
FIG. 7 is a schematic view of an under-screen biometric identification apparatus provided in another embodiment of the present application.

Optionally, in an embodiment of the present application, as shown in FIG. 7, the optical function layer 310 is disposed under the display screen 330, and the biometric identification module 320 is disposed under the optical function layer 310.

Specifically, a light leakage area is set under the display screen 330. For example, there is a layer of black foam under the display screen 330, the foam layer is removed in a specific area to form a light leakage area, and the under-screen biometric identification apparatus 300 is mounted under the light leakage area of the display screen 330.

The display screen 330 may include a light emitting layer 331 configured to provide an optical signal for biometric detection and identification. The light emitting layer 331 includes a light source, for example, for an OLED display screen, the light emitting layer 331 includes multiple organic light emitting diode light sources.

As shown in FIG. 7, optionally, the display screen 330 may further include a third quarter-wave plate 332 and a second linear polarizer 333, wherein the third quarter-wave plate 332 is disposed above the light emitting layer 331, the second linear polarizer 333 is disposed above the third quarter-wave plate 332.

Optionally, an optical axis of the third quarter-wave plate 332 is at an angle of 45° to a polarization direction of the second linear polarizer 333.

It should be understood that the display screen 330 may further include other intrinsic components, such as a substrate 334 and a cover glass 335, but the embodiments of the present application are not limited thereto.

Optionally, when the under-screen biometric identification 300 is mounted under the display screen 330, a direction in which the optical function layer 310 is disposed under the display screen 330 is a direction in which an intensity of emergent light is the largest.

Specifically, the direction in which the optical function layer 310 is disposed under the display screen 330 determines relationship between the polarization direction of the linear polarizer, the optical axis of the quarter-wave plate in the optical function layer 310, and the polarization direction of the linear polarizer, the optical axis of the quarter-wave plates in the display screen 330, therefore, the emergent light intensity of the optical function layer 310 can be maximized by adjusting the direction in which the optical function layer 310 is disposed.

The light emitting layer 331 emits light toward to the above of the screen while part of the light leaks to an area under the screen. The light is natural light which means polarization intensities are same in all directions. Light emitted upward from the light-emitting layer 331 passes through the second linear polarizer 333 to form linearly polarized light, and then passes through the cover glass 335 to the above of the screen. When a finger is placed on the screen, the finger may reflect the linearly polarized light which then penetrates the cover glass 335 and passes through the linear polarizer 333. The linearly polarized light associated with a finger feature passes through the third quarter-wave plate 332 inside the screen to form circularly polarized light, which then passes through the entire screen to the under-screen light leakage area. So the under-screen biometric identification apparatus 300 disposed under the light leakage area under the screen can perform under-screen biometric identification. The linear polarizer and the quarter-wave plate inside the screen can weaken interference from external strong light (eliminate light in a non-polarized direction) and weaken reflected light reflected to the outside of the screen (the principle is the same as in FIG. 4).

Figure 8:
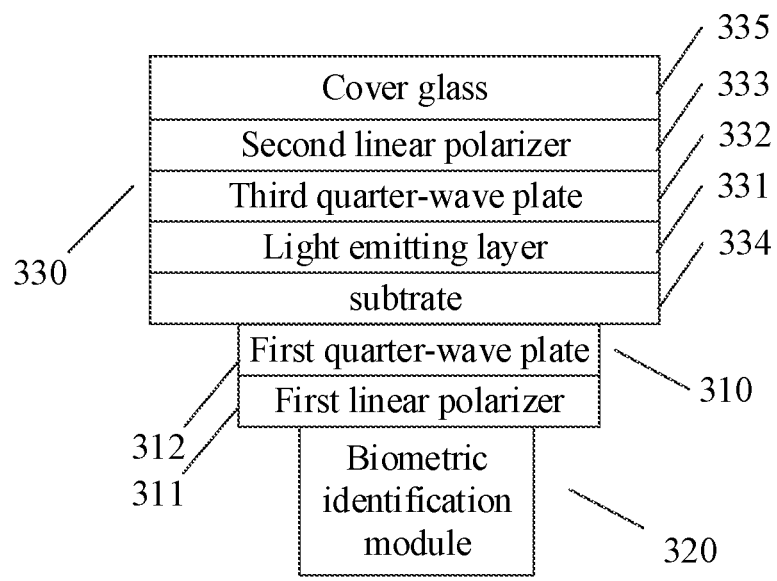
FIG. 8 is a schematic view of an under-screen biometric identification apparatus provided in another embodiment of the present application.
Figure 9:
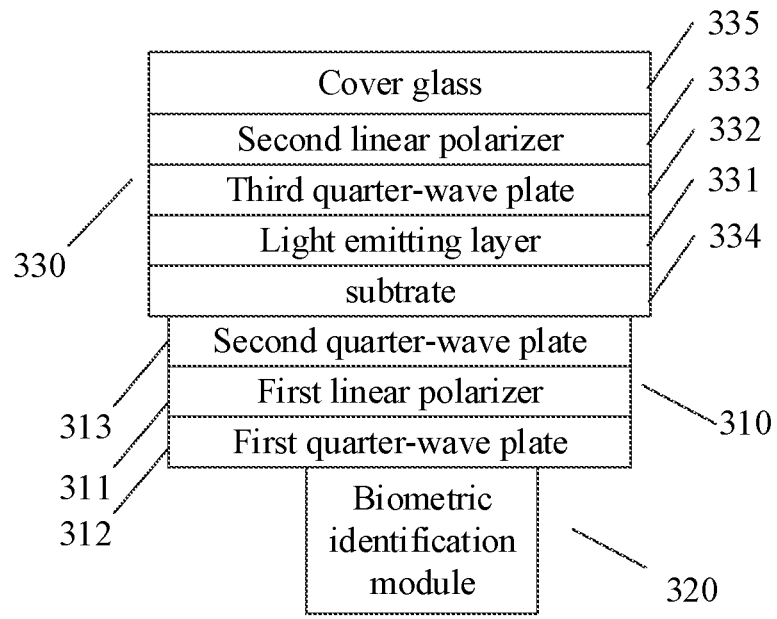
FIG. 9 is a schematic view of an under-screen biometric identification apparatus provided in another embodiment of the present application.

As shown in FIG. 8 or FIG. 9, if the under-screen biometric identification apparatus 300 adopts the form shown in FIG. 5 or FIG. 6, after passing through the screen, circularly polarized light associated with a finger feature may pass through a quarter-wave plate (first quarter-wave plate 312 in FIG. 8, second quarter-wave plate 313 in FIG. 9) and becomes linearly polarized light. The linearly polarized light may pass through a first linear polarizer 311. Light leaking downwards the display screen is natural light which may introduce unwanted noise. After passing through the quarter-wave plate (first quarter-wave plate 312 in FIG. 8, second quarter-wave plate 313 in FIG. 9), the natural light remains as natural light. When passing through the first linear polarizer 311, light in a non-polarized direction can be eliminated, thereby reducing noise and improving the efficiency of biometric identification.

If the under-screen biometric identification apparatus 300 adopts the form shown in FIG. 6, as described above, light reflected from the under-the-screen biometric identification apparatus 300 may be weakened after passing through the first linear polarizer 311 and the first quarter-wave plate 312, such that the appearance problem may be improved.

Figure 10:
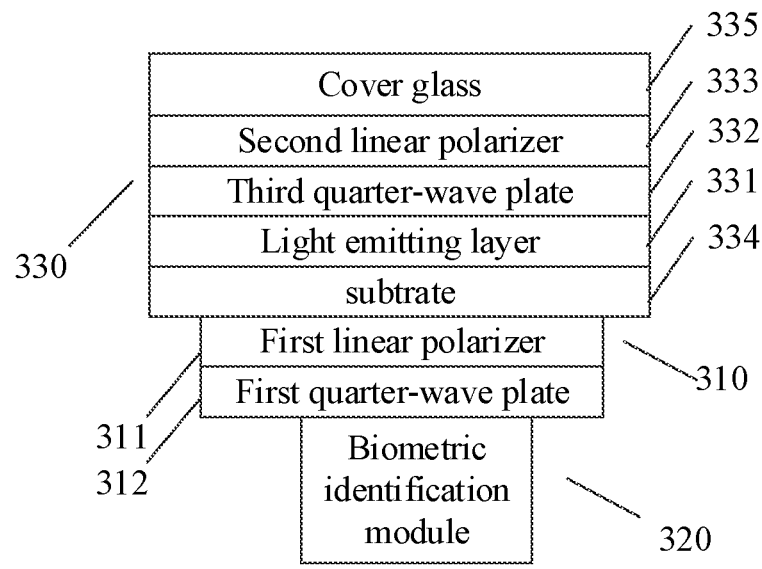
FIG. 10 is a schematic view of an under-screen biometric identification apparatus provided in another embodiment of the present application.

As shown in FIG. 10, if the under-screen biometric identification apparatus 300 adopts the form shown in FIG. 3, after passing through the screen, circularly polarized light associated with a finger feature passes through a first linear polarizer 311 and becomes linearly polarized light, meanwhile, after passing through the first linear polarizer 311, light in a non-polarized direction of leaking light downward the display screen 330 is also eliminated, so that a ratio of an useful optical signal remains the same, that is, the efficiency of biometric identification is not affected. At the same time, as described above, light reflected from the under-the-screen biometric identification apparatus 300 may be weakened by passing through the first linear polarizer 311 and a first quarter-wave plate 312, such that the appearance problem may be improved.

In summary, the scheme of FIG. 10 can improve the appearance problem, the scheme of FIG. 8 can improve the efficiency of biometric identification, and the scheme of FIG. 9 can not only improve the appearance problem but also improve the efficiency of biometric identification.

Therefore, the technical solutions of the embodiments of the present application adopts an optical function layer including a linear polarizer and a quarter-wave plate, which could improve the performance of the under-screen biometric identification.

The biometric identification module 320 may be a variety of modules using light for biometric identification. For example, the biometric identification module 320 may be the foregoing biometric identification module 140.

Figure 11:
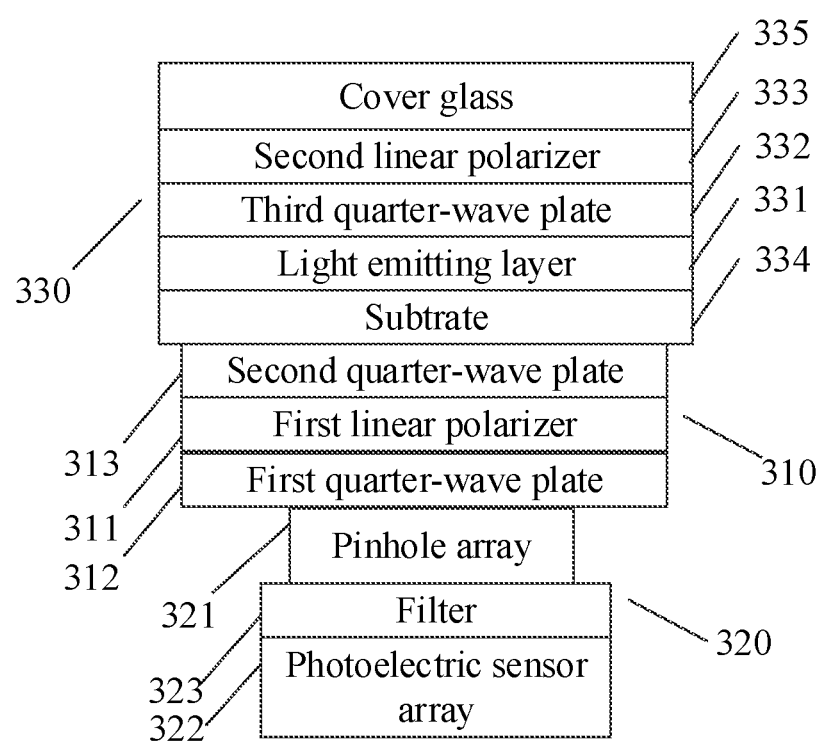
FIG. 11 is a schematic view of an under-screen biometric identification apparatus provided in another embodiment of the present application.

Optionally, in an embodiment of the present application, as shown in FIG. 11, the biometric identification module 320 may include a pinhole array 321 and a photoelectric sensor array 322, wherein the light is transmitted to the photoelectric sensor array 322 through the pinhole array 321.

The pinhole array 321 may be, for example, a periodic array of pinholes for directing light to the photoelectric sensor array 322.

The photoelectric sensor array 322 may detect light to obtain a biometric detection signal. For example, the photoelectric sensor array 322 can adopt an array of photodiodes which converts optical signals into electrical signals, so that imaging may be performed based on the electrical signals.

Optionally, in an embodiment of the present application, sidewalls of the pinhole array 321 are black. That is, a blackened pinhole array 321 may be adopted. In such a way, a color of the pinhole array 321 can be consistent with other areas outside the light leakage area of the display screen, that is, black, so that the appearance problem can be further improved.

Optionally, in an embodiment of the present application, the biometric identification module 320 further includes a filter 323, wherein the filter 323 is disposed between the pinhole array 321 and the photoelectric sensor array 322 for filtering the light.

It should be understood that the foregoing under-screen biometric apparatus 300 may also be called as a biometric identification module. The display screen 330 and the under-screen biometric identification apparatus 300 may be connected by an adhesive layer or other connection manners, which is not limited by the embodiment of the present application. In addition, a connection manner among components in the under-screen biometric identification apparatus 300 is not limited by the embodiment of the present application The embodiment of the present application further provides an electronic device, which may include a display screen and the foregoing under-screen biometric identification apparatus in various embodiments of the present application.

The electronic device may be any electronic device having a display screen, the under-screen biometric identification may be implemented by adopting the technical solutions in the embodiments of the present application.

The display screen may adopt the foregoing display screen, such as an OLED display or other display screen. Relative description of the display screen may refer to the foregoing description of the display screen, and for brevity, no further details are provided herein.

Optionally, the display screen is an organic light-emitting diode display screen, and a light-emitting layer of the display screen includes multiple organic light emitting diode light sources, wherein the under-screen biometric identification apparatus adopts at least some of the organic light emitting diode light source as an excitation light source for biometric identification.

It should be understood that the specific examples in the embodiments of the present application are only intended to help those skilled in the art to better understand the embodiments of the present application.

It should also be noted that, terms used in embodiment of the present application and the claims appended hereto are merely for the purpose of describing particular embodiments, and are not intended to limit the embodiments of the present application. For example, the use of a singular form of "a", "the" and "said" in the embodiment of the present application and the claims appended hereto are also intended to include a plural form, unless otherwise clearly indicated herein by context.

Those of ordinary skill in the art may be aware that, various exemplary units described in combination with the embodiments disclosed herein may be implemented by electronic hardware, computer software or a combination of both, to clearly illustrate the interchangeability of hardware and software, the components and steps of the various embodiments have been generally described in terms of functionality in the foregoing description. Whether these functions are executed in hardware or software mode depends on a particular application and a design constraint condition of the technical solution. Persons skilled in the art may use different methods to implement the described functions for every particular application, but it should not be considered that such implementation goes beyond the scope of the present application.

In the several embodiments provided by the present application, it should be understood that the disclosed system and apparatus may be implemented in other manners. For example, the apparatus described in the foregoing embodiments are merely illustrative. For example, the division of the unit is only a division of logical function. In actual implementation, there may be another division manner, for example, multiple units or components may be combined or may be integrated into another system, or some features can be ignored or not executed. In addition, the mutual coupling or direct coupling or communication connection shown or discussed may be an indirect coupling or communication connection through certain interface, device or unit, or an electrical, mechanical or other form of connection.

The units described as separate components may or may not be physically separated, and the components used as display units may or may not be physical units, that is, may be located in one place, or may be distributed to multiple network units. Depending on the actual needs, part or all of the units may be selected to achieve the purpose of the embodiments of the present application.

In addition, each functional unit in each embodiment of the present application may be integrated into one processing unit, or each unit may be physical existence separately, or two or more units may be integrated into one unit. The foregoing integrated unit may be implemented in the form of hardware or in the form of a software functional unit.

If the integrated unit is implemented in the form of a software functional unit and sold or used as a standalone product, it may be stored in a readable storage medium of a computer. Based on such understanding, the technical solution of the present application in essence or the part making contribution to the prior art, or all or part of the technical solution may be embodied in the form of a software product, the computer software product is stored in a storage medium and includes a number of instructions for instructing a computer device (may be a personal computer, server, or network device, etc.) to perform all or part of the steps of the methods described in various embodiments of the present application. The foregoing storage medium includes: U disk, mobile hard disk, read-only memory (ROM), random access memory (RAM), a magnetic disk, or an optical disk, and the like that may store program code.

The foregoing contents are merely a specific implementation of the embodiments of the present application, but the protection scope of the present application is not limited thereto. Various modifications or replacements may be readily conceivable to any person skilled in the art within the technical scope disclosed in the present application, and such modifications or replacements shall fall within the protection scope of the present application. Therefore, the protection scope of the embodiments the present application shall be defined by the claims.

What is claimed is:

1. An under-screen biometric identification apparatus, applicable to an electronic device having a display screen, wherein the display screen has a light leakage area and the under-screen biometric identification apparatus is mounted under the light leakage area of the display screen, wherein the display screen comprises a light emitting layer, a third quarter-wave plate and a second linear polarizer, wherein the third quarter-wave plate is disposed above the light emitting layer, the second linear polarizer is disposed above the third quarter-wave plate, the under-screen biometric identification apparatus comprising:

an optical function layer, structured to be arranged under the light leakage area of the display screen, the optical function layer comprising a first linear polarizer, a first quarter-wave plate and a second quarter-wave plate, wherein the second quarter-wave plate, the first linear polarizer, and the first quarter-wave plate are arranged in a stack manner, the first linear polarizer is disposed between the second quarter-wave plate and the first quarter-wave plate, the first quarter-wave plate is disposed at a side of the optical function layer adjacent to the optical biometric sensor;

an optical biometric sensor comprising an optical sensing array structured to be arranged below the optical function layer, wherein a biometric collection area of the optical biometric sensor is within a display area of the display screen;

wherein the optical sensing array is configured to receive reflected light from a finger above the display screen and transmitted through the second quarter-wave plate, the first linear polarizer and the first quarter-wave plate, and convert the received light into biometric detection signal for biometric identification;

wherein the optical biometric sensor is included in a biometric identification module configured to perform biometric identification; and the first linear polarizer and the first quarter-wave plate are configured to weaken light reflected from the biometric identification module from being transmitted to the display screen to improve an appearance of the electronic device.

2. The under-screen biometric identification apparatus according to claim 1, wherein an optical axis of the first quarter-wave plate is at an angle of 45° to a polarization direction of the first linear polarizer.

3. The under-screen biometric identification apparatus according to claim 1, wherein an optical axis of the first quarter-wave plate is at an angle of 45° to a polarization direction of the first linear polarizer; an optical axis of the second quarter-wave plate is at an angle of 45° to the polarization direction of the first linear polarizer.

4. The under-screen biometric identification apparatus according to claim 1, wherein an optical axis of the third quarter-wave plate is at an angle of 45° to a polarization direction of the second polarizer.

5. The under-screen biometric identification apparatus according to claim 1, wherein the optical function layer is disposed under the display screen in a direction in which an emergent light intensity is the largest.

6. The under-screen biometric identification apparatus according to claim 1, wherein the biometric identification module further comprises light directing structure arranged above the optical biometric sensor, the light directing structure is configured to direct the reflected light from the finger to be transmitted to the optical sensing array.

7. The under-screen biometric identification apparatus according to claim 6, wherein the light directing structure comprises at least one of a periodic pinhole array, a collimator array, or a lens unit.

8. The under-screen biometric identification apparatus according to claim 6, wherein the biometric identification module further comprises an optical filter, wherein the optical filter is disposed between the light directing structure and the optical sensing array.

9. An electronic device, comprising: a display screen and an under-screen biometric identification apparatus; wherein the display screen has a light leakage area and the under-screen biometric identification apparatus is mounted under the light leakage area of the display screen, wherein the display screen comprises a light emitting layer, a third quarter-wave plate and a second linear polarizer, wherein the third quarter-wave plate is disposed above the light emitting layer, the second linear polarizer is disposed above the third quarter-wave plate, wherein the under-screen biometric identification apparatus comprises:
- an optical function layer, structured to be arranged under the light leakage area of the display screen, the optical function layer comprising a first linear polarizer, a first quarter-wave plate and a second quarter-wave plate, wherein the second quarter-wave plate, the first linear polarizer, and the first quarter-wave plate are arranged in a stack manner, the first linear polarizer is disposed between the second quarter-wave plate and the first quarter-wave plate, the first quarter-wave plate is disposed at a side of the optical function layer adjacent to the optical biometric sensor;
- an optical biometric sensor comprising an optical sensing array structured to be arranged below the optical function layer, wherein a biometric collection area of the optical biometric sensor is within a display area of the display screen;
- wherein the optical sensing array is configured to receive reflected light from a finger above the display screen and transmitted through the second quarter-wave plate, the first linear polarizer and the first quarter-wave plate, and convert the received light into biometric detection signal for biometric identification;

wherein the optical biometric sensor is included in a biometric identification module configured to perform biometric identification; and the first linear polarizer and the first quarter-wave plate are configured to weaken light reflected from the biometric identification module from being transmitted to the display screen to improve an appearance of the electronic device.

10. The electronic device according to claim 9, wherein the display screen is an organic light-emitting diode display screen, and a light-emitting layer of the display screen comprises multiple organic light emitting diode light sources, wherein the under-screen biometric identification apparatus adopts at least some of the organic light emitting diode light source as an excitation light source for biometric identification.

11. The electronic device according to claim 9, wherein an optical axis of the first quarter-wave plate is at an angle of 45° to a polarization direction of the first linear polarizer; an optical axis of the second quarter-wave plate is at an angle of 45° to the polarization direction of the first linear polarizer.

12. The electronic device according to claim 9, wherein the optical function layer is disposed under the display screen in a direction in which an emergent light intensity is the largest.

* * * * *